(12) United States Patent
Ramamurthy et al.

(10) Patent No.: US 6,851,840 B2
(45) Date of Patent: Feb. 8, 2005

(54) ILLUMINATED SURFACES IN THE INTERIOR OF AN AUTOMOBILE

(75) Inventors: Rajkumar Ramamurthy, Auburn Hills, MI (US); Joseph Khoury, Stromberg (DE); Roland Ruegenberg, Bad Sobernheim (DE)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 10/170,627

(22) Filed: Jun. 14, 2002

(65) Prior Publication Data

US 2003/0231508 A1 Dec. 18, 2003

(51) Int. Cl.[7] ................................................. B60Q 1/00
(52) U.S. Cl. ........................ 362/489; 362/84; 362/482
(58) Field of Search .................................. 362/482, 489, 362/488, 54, 29, 39, 30, 16

(56) References Cited

U.S. PATENT DOCUMENTS

| 4,849,585 | A | * | 7/1989 | Vidican et al. | 200/61.54 |
|---|---|---|---|---|---|
| 5,357,408 | A | * | 10/1994 | Lecznar et al. | 362/490 |
| 5,406,303 | A | * | 4/1995 | Salmon et al. | 345/75.1 |
| 5,424,006 | A | | 6/1995 | Yoshihiko et al. | 252/301.4 R |
| 5,997,161 | A | * | 12/1999 | Stringfellow et al. | 362/489 |
| 6,028,694 | A | * | 2/2000 | Schmidt | 359/264 |
| 6,234,269 | B1 | * | 5/2001 | Salzer et al. | 180/333 |
| 6,257,745 | B1 | * | 7/2001 | Speth et al. | 362/488 |
| 6,499,852 | B1 | * | 12/2002 | Kino et al. | 362/23 |

FOREIGN PATENT DOCUMENTS

GB          2152886 A       1/1985

* cited by examiner

*Primary Examiner*—John Anthony Ward
(74) *Attorney, Agent, or Firm*—Blank Rome LLP

(57) ABSTRACT

A lighting system for a vehicle having luminescent or "glow-in-the-dark" markings placed on an interior surface of the vehicle and a light source located remotely from the markings to illuminate the markings, particularly at night. The markings can be placed on any surface inside a vehicle, such as a gear shift know, door handle or steering column control stalk. Additionally, the light source can be placed in the roof of the vehicle, behind a steering wheel, or any other location having an unobstructed view of the markings.

23 Claims, 2 Drawing Sheets

ILLUMINATED SURFACES IN THE INTERIOR OF AN AUTOMOBILE

FIELD OF INVENTION

The present invention is directed towards a lighting system for illuminating markings or labels on surfaces inside an automobile so that the markings can be seen at night.

BACKGROUND OF THE INVENTION

Typically, the interior of a car is not illuminated during night time driving so that the driver can see through a vehicle's windows without being hampered by glare and reflection. It is therefore advantageous to limit the amount of light within the interior of the vehicle while driving, to increase the driver's ability to see the road. With this in mind, important markings, labels or other indicia on a vehicle's dashboard are typically backlit to provide the limited, but necessary lighting to the markings. For example, in most cars, the instrument panel, the climate control panel and the radio are backlit to enable the driver to see the control buttons and knobs.

Backlighting is accomplished by placing a directed light source under a graphics surface and shining a light through a transparent portion of the marking, thereby illuminating it. Backlighting the markings in a vehicle's dashboard has been problem free due to the ample physical space available in the dashboard for the necessary light source components. However, due to the limited physical space in steering column stalks, backlighting markings here is difficult and expensive, and heretofore has not been widely practiced. Therefore, the markings on the stalks are typically not illuminated, and the driver must either memorize the location and operation of the controls on the stalk, or turn on a roof-mounted reading light. Additionally, other interior surfaces and structures in a vehicle suffer from similar disadvantages, where installing a backlighting feature would require considerable modification, or may be impossible due to the limited space available.

Therefore, it is an object of the present invention to provide a cost-effective lighting system for markings or labels in the interior of a vehicle requiring minimal modification to existing vehicles. It is a further object of the invention to provide a lighting system for markings that do not interfere with a drivers vision, particularly at night. It is still a further object of the invention to provide a lighting means for markings on a steering column stalk, requiring minimal modification to the stalk.

SUMMARY OF THE INVENTION

In view of the foregoing, the present invention is directed to a lighting system for a vehicle having luminescent markings placed on an interior surface of the vehicle and a light source located remotely from the markings to illuminate the markings, particularly at night. The markings are preferably made from phosphorescent (glow-in-the dark) pigments and are placed onto a steering column stalk with the light source placed opposite the markings, preferably in a rear portion of a steering wheel.

DETAILED DESCRIPTION OF THE PREFERRED EMBODIMENT

Figure 1:
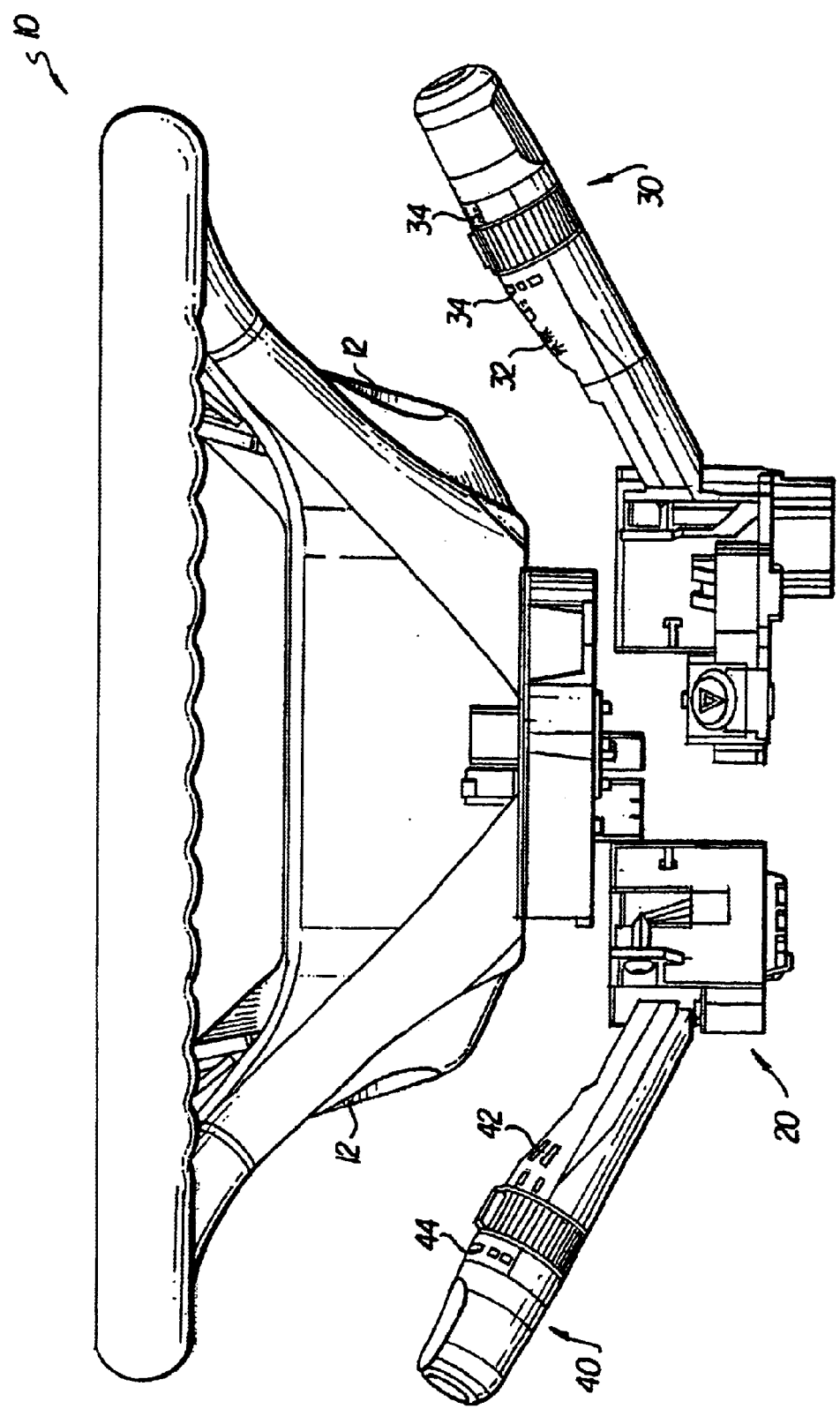
FIG. 1 shows a top view of a steering wheel and column of a first embodiment of the present invention.

Referring now in detail to the drawing, FIG. 1 shows a standard vehicle steering wheel 10 and steering column 20, incorporating the features of the present invention. The steering column 20 has two stalks 30 and 40 extending from opposite sides thereof. The stalks 30 and 40 control various functions on a vehicle, such as the vehicle's headlights, windshield wipers, and turn signals, and are common and well known in the prior art. The stalks 30 and 40 have various markings thereon to indicate the controls, settings and operation of its various functions. For example arrow markings 32 indicate the direction the stalk 30 must be moved to operate the turn signal. Other markings 34, 42 and 44 provide information on other stalk controls, settings and their operation.

The markings 32, 34, 42 and 44 are preferably made of a luminescent, highly visible, "glow-in-the dark" material so that they can be more easily seen at night. Examples of the type of materials are phosphorescent materials, reflective materials, and fluorescent materials. An example of a phosphorescent materials is LUMINOVA®, manufactured by NEMOTO & CO., LTD, which is a bright luminescent pigment based upon Strontium Oxide Aluminate chemistry and is described in U.S. Pat. No. 5,424,006, incorporated herein by reference. The term luminescent material is defined here to be a generic term covering any bright, shiny or similar material (including the materials described above) to aid a driver to see the markings. Additionally, the present invention does not intend to limit the markings 32, 34, 42 and 44 to the above luminous materials, but are intended to cover any and all markings which can be seen by the eye, including simple white or black lettering.

To enhance the visibility of the markings 32, 34, 42 and 44, a light source 12, such as a light emitting diode (LED), is placed behind the steering wheel 10 opposite the markings, and is positioned so that its light is directed onto the markings 32, 34, 42 and 44. The light source 12 can be easily incorporated into the back of the steering wheel 10, which has more physical space than the stalks 30 and 40 for the light source 12.

The light source 12 can be any light source which helps to illuminate the markings, such as a yellow light, white light, infra-red, ultra violet, or other light wavelength. The light source 12 can be selected depending on the color, luminescence or other desired effect on the markings 32, 34, 42 and 44. Oftentimes, the choice of the marking material and the light source 12 will be linked so that the two give the greatest desired effect.

Additionally, because lighting is particularly needed at night, the light source 12 can be directly linked to the operation of the vehicle's headlights, so that when the headlights are turned on, the light source 12 will also be turned on. Alternatively, the light source can have its own on-off control or be left on at all times.

Figure 2:
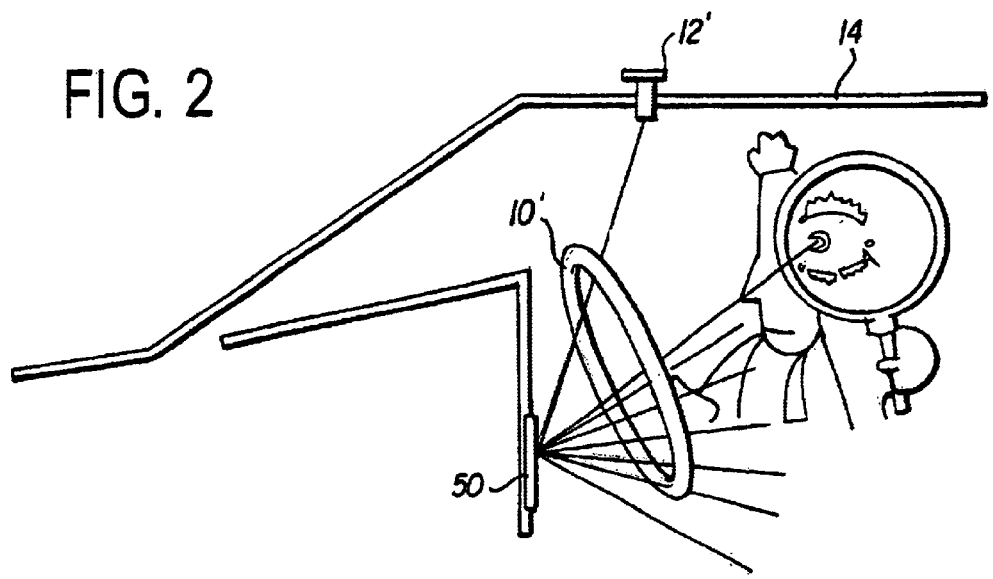
FIG. 2 shows a second embodiment of the invention having a roof mounted light source.

FIG. 2 shows an alternative embodiment of the invention having markings 50 and a lights source 12' placed in different locations inside a vehicle, with the markings 50 being located behind the steering wheel 10' and the light source 12' mounted in the roof 14. Although the markings 50 are shown behind the steering wheel 10', they can be placed on any surface in a car, such as a gear shift lever, a door handle or a control stalk as previously described. Furthermore, as in the previous embodiment, the markings are made from luminescent, "glow-in-the-dark," or similar material that by itself, or with the aid of a light source, is easily seen at night. The light source 12' is situated in the roof 14 and its light directed towards the markings 50. The roof 14 provides the necessary physical space to hold the light source's 12' components and provides a location to which most surfaces in the vehicle are exposed.

Similar to the light source 12 described above, the light source 12' may be made to emit specific colors or wavelengths of light and the markings 50 may be made to reflect the particular wavelength emitted by the light source 12'. The light source 12' heightens the reflective or illuminating effect of the markings 50 enhancing their visibility.

In order to minimize the glare and reflection inside the vehicle, the light source 12' can be constructed so that it emits light in a narrowly focused direction, targeted at the specific markings to be illuminated.

Figure 3:
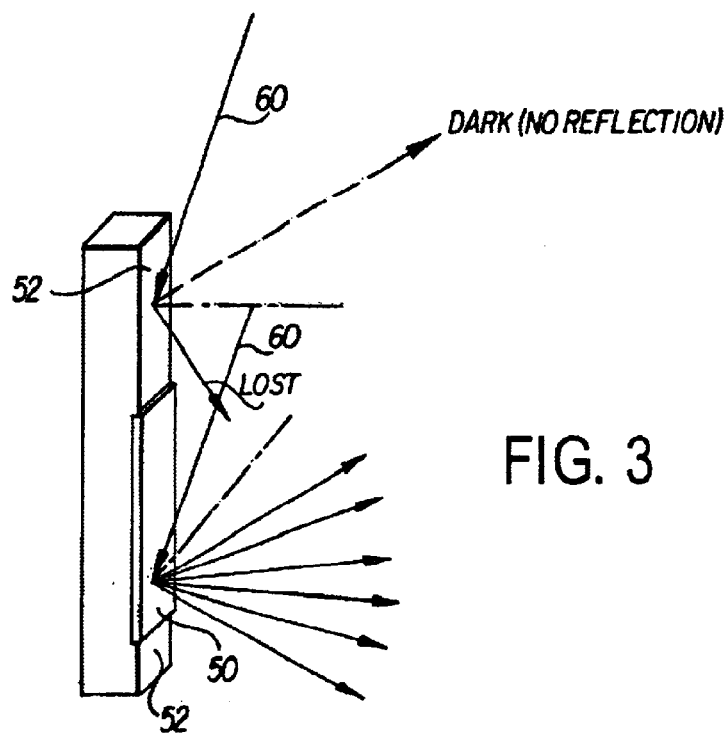
FIG. 3 shows the reflection of light rays off of a surface.

It is also preferred that the area surrounding the markings 52 be made from a non-reflective material so that any light that strikes the surrounding area 52 is absorbed or reflected away from the driver's eye. FIG. 3 shows light rays 60 striking markings 50 and the surrounding area 52. The light rays 60 striking the markings 50 are completely reflected allowing the driver to see the markings 50. However, the light rays 60 striking the darkened area 52 surrounding the markings 50 are either absorbed or reflected them away from the driver's eyes.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. In this regard, any markings, graphics or other indicia within the interior of a car, made from a luminescent material and having a light source placed remotely from the markings, is within the scope of the present invention.

What is claimed is:

1. A lighting assembly for a steering column control stalk of a vehicle, comprising:
   one or more control stalks located on a steering column;
   said control stalks having markings thereon to provide information relating to the operation of the control stalk, said markings being composed of a luminescent material that allow the markings to be seen both day and night that and;
   a light source placed remotely from the markings and positioned so as to shine light onto the markings.

2. The lighting assembly for a steering column control stalk of a vehicle of claim 1, wherein:
   the markings are made of a brightly-colored material.

3. The lighting assembly for a steering column control stalk of a vehicle of claim 1, wherein:
   the markings are made of a phosphorescent material.

4. The lighting assembly for a steering column control stalk of a vehicle of claim 1, wherein:
   the light source is placed in a rear portion of a steering wheel.

5. A lighting assembly for a steering column control stalk, comprising:
   at least one control stalk located on a steering column, said stalk having markings thereon;
   a stationary light source located remotely from said control stalk and positioned so that it directs light onto the markings.

6. The lighting assembly for a steering column control stalk of claim 5, comprising:
   the light source being located in a rear portion of a steering wheel.

7. The lighting assembly for a steering column control stalk of claim 5, wherein:
   a second control stalk with markings is located on the steering column; and
   the number of light sources equals the number of stalks, such that a light source is located opposite each stalk.

8. The lighting assembly for a steering column control stalk of claim 5, wherein:
   the markings are made of a luminescent material.

9. The lighting assembly for a steering column control stalk of claim 5, wherein:
   the markings are made of a reflective material.

10. The lighting assembly for a steering column control stalk of claim 5, wherein:
    the markings are made of a phosphorescent material.

11. A lighting assembly for markings inside of a vehicle comprising:
    markings on an interior surface of a vehicle, the markings being made of a luminescent material; and
    a light source located in a portion of a steering column of the vehicle remote from the markings, the light source being positioned to illuminate the markings.

12. The lighting assembly for markings inside of a vehicle of claim 11, wherein:
    the markings are made of a reflective material.

13. The lighting assembly for markings inside of a vehicle of claim 11, wherein:
    the markings are made from a material that reflects a particular range of light wavelengths.

14. The lighting assembly for markings inside of a vehicle of claim 13, wherein:
    the light source provides light having wavelengths that are reflected by the markings.

15. The lighting assembly for markings inside of a vehicle of claim 14, wherein:
    the markings are made from an ultra violet light reflective material and the light source is an ultra violet light source.

16. The lighting assembly for markings inside of a vehicle of claim 11, wherein:
    an area surrounding the markings is made of a light absorbing material so as to enhance the illuminating effect of the markings.

17. The lighting assembly for markings inside of a vehicle of claim 11, wherein:
    the light source emits a narrowly focused beam of light and directs the light onto one or more specific locations for illumination.

18. The lighting assembly for markings inside of a vehicle of claim 11, wherein:
    the markings are placed on a steering column stalk of the vehicle.

19. The lighting assembly for a steering column control stalk of a vehicle of claim 1, wherein:
    the light source provides light having wavelengths that are reflected by the markings, thereby illuminating only the markings.

20. The lighting assembly for a steering column control stalk of claim 5, wherein:
    the light source provides light having wavelengths that are reflected by the markings, thereby illuminating only the markings.

21. The lighting assembly for a steering column control stalk of a vehicle of claim 1, wherein:

the light source is placed in a roof of the vehicle.

22. A lighting assembly for a steering column control stalk, comprising:

one or more control stalks located on a steering column, said stalks having markings made of a luminescent material thereon; and a light source located in a rear portion of a steering wheel remote from said control stalks and positioned so that it directs light onto the markings.

23. The lighting assembly for a steering column control stalk of claim 22, wherein the markings are made of a reflective material.

* * * * *